(12) United States Patent
Nakazaki et al.

(10) Patent No.: US 10,322,649 B2
(45) Date of Patent: Jun. 18, 2019

(54) LOAD-DETECTING DEVICE FOR PROPERLY DETECTING A LOAD AND SUPPRESSING DETERIORATION OF DETECTION ACCURACY

(71) Applicant: Fujikura Ltd., Tokyo (JP)

(72) Inventors: Shigeru Nakazaki, Tokyo (JP); Naohiro Kikukawa, Sakura (JP); Tetsuya Kawahira, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/563,219

(22) PCT Filed: Mar. 30, 2016

(86) PCT No.: PCT/JP2016/060519
§ 371 (c)(1),
(2) Date: Sep. 29, 2017

(87) PCT Pub. No.: WO2016/159155
PCT Pub. Date: Oct. 6, 2016

(65) Prior Publication Data
US 2018/0086228 A1    Mar. 29, 2018

(30) Foreign Application Priority Data

Mar. 30, 2015  (JP) .................................. 2015-069777

(51) Int. Cl.
*B60N 2/00*   (2006.01)
*B60N 2/90*   (2018.01)
(Continued)

(52) U.S. Cl.
CPC ............... *B60N 2/002* (2013.01); *B60N 2/64* (2013.01); *B60N 2/7094* (2013.01); *B60N 2/90* (2018.02);
(Continued)

(58) Field of Classification Search
CPC ........... G01L 1/00; G01L 1/14; G01L 25/003; G08B 21/00; B60N 2/00; B60N 2/002;
(Continued)

(56) References Cited

U.S. PATENT DOCUMENTS 6,849,808 B2 *  2/2005  Enomoto ............... B60N 2/002
                                                 177/144
7,851,716 B2 * 12/2010  Niguet ................... G01D 11/20
                                                 200/43.18
(Continued)

FOREIGN PATENT DOCUMENTS

CN       100478216 C    4/2009
DE    202014010173 U1    2/2015
(Continued)

OTHER PUBLICATIONS

International Search Report dated Jun. 28, 2016, issued in counterpart International Application No. PCT/JP2016/060519(2 pages).
(Continued)

Primary Examiner — Jonathan M Dunlap
Assistant Examiner — Octavia Hollington
(74) Attorney, Agent, or Firm — Westerman, Hattori, Daniels & Adrian, LLP

(57) ABSTRACT

The load-detecting device 1 includes a base 2 engaged with a pair of S springs 100, and a load detection sensor unit SU that is mounted on the base 2 and includes a first electrode 52 and a second electrode 62 facing each other and being brought into contact with each other by pressing force of the seat cushion SC when a load is detected, The upper surface 47S of the load detection sensor unit SU that is pressed by the seat cushion SC when a load is detected is located at the same height as or higher than the upper ends 101 of the respective S springs 100, with which the base 2 is engaged, and the contact surface between the first electrode 52 and the (Continued)

second electrode 62 is located lower than the upper ends 101 of the respective S springs 100, with which the base 2 is engaged.

20 Claims, 8 Drawing Sheets

(51) Int. Cl.
    *H01H 13/16*    (2006.01)
    *H01H 35/00*    (2006.01)
    *B60N 2/64*    (2006.01)
    *B60N 2/70*    (2006.01)

(52) U.S. Cl.
    CPC ............ *H01H 13/16* (2013.01); *H01H 35/00* (2013.01); *H01H 35/003* (2013.01); *H01H 2231/026* (2013.01)

(58) Field of Classification Search
    CPC .......... B60N 2/7094; B60N 2/64; B60N 2/70; H01H 35/003; H01H 2231/026
    USPC ..................................... 73/862.625
    See application file for complete search history.

(56) References Cited

U.S. PATENT DOCUMENTS

| | | | |
|---|---|---|---|
| 8,183,484 B2* | 5/2012 | Niguet | H01H 13/16 200/330 |
| 9,409,496 B2* | 8/2016 | Kordel | B60N 2/7094 |
| 9,421,884 B2* | 8/2016 | Boyer | B60N 2/646 |
| 9,776,530 B2* | 10/2017 | Boyer | B60N 2/002 |
| 2005/0072249 A1* | 4/2005 | Maeda | B60N 2/002 73/862.046 |
| 2008/0046152 A1 | 2/2008 | Ohtake et al. | |
| 2010/0148549 A1 | 6/2010 | Niguet et al. | |
| 2014/0246887 A1* | 9/2014 | Clos | B60N 2/002 297/217.3 |
| 2015/0137568 A1 | 5/2015 | Boyer | |
| 2016/0214505 A1 | 7/2016 | Nakazaki et al. | |

FOREIGN PATENT DOCUMENTS

| | | |
|---|---|---|
| EP | 2450228 A2 | 5/2012 |
| EP | 2450229 A2 | 5/2012 |
| EP | 2 727 497 A1 | 5/2014 |
| EP | 3045080 A1 | 7/2016 |
| JP | 49-98763 U | 8/1974 |
| JP | 2009-525573 A | 7/2009 |
| JP | 2011-105278 A | 6/2011 |
| WO | 2013/002289 A1 | 1/2013 |
| WO | 2013/178486 A1 | 12/2013 |
| WO | 2015/037586 A1 | 3/2015 |

OTHER PUBLICATIONS

Office Action dated Apr. 16, 2018, issued in counterpart Chinese Application No. 201680001434.0. (7 pages).

Office Action dated Sep. 4, 2018, issued in counterpart Japanese Application No. 2017-226727, with English machine translation. (6 pages).

Decision to Grant a Patent dated Jan. 29, 2019, issued in counterpart Japanese Application No. 2017-226727, with English machine translation. (6 pages).

Extended (supplementary) European Search Report dated Oct. 31, 2018, issued in counterpart European Application No. 16773036.5. (11 pages).

Office Action dated Mar. 5, 2019, issued in counterpart CN Application No. 201680001434.0, with English translation (9 pages).

\* cited by examiner ial sitting means sitting of a person with his/her buttock located backmost side of the seat surface and his/her back being in contact with the backrest. Therefore, the load-detecting device engaged with the S spring is configured to properly detect a load when the load-detecting device is pressed by the seat cushion in a direction perpendicular to the S spring plane. However, a sitting person may front-side sit, that is, a sitting person may sit on the front side comparing to the normal sitting, or a sitting person may side-shift sit, that is, a sitting person may sit in a state where the sitting person is shifted in the lateral direction from the normal sitting. In those cases, the lower surface of the seat cushion applies, to the S spring, force in a direction that is oblique to the S spring plane. Therefore, the load-detecting device that detects a load by being pressed by the seat cushion also receives force in a direction that is oblique to a pressure detection direction of the load-detecting device from the seat cushion.

LOAD-DETECTING DEVICE FOR PROPERLY DETECTING A LOAD AND SUPPRESSING DETERIORATION OF DETECTION ACCURACY

TECHNICAL FIELD

The present invention relates to a load-detecting device that is suitable for properly detecting a load and suppressing deterioration of detection accuracy.

BACKGROUND ART

As one of safety systems in vehicles, an alarm system for warning that a seat belt is not worn during ride is practically used. This alarm system warns when wearing of the seat belt is not sensed in a state where sitting of a person is sensed. As a device for sensing sitting of a person, a load-detecting device for detecting a load due to sitting may be used.

Some of such load-detecting devices may be disposed under a seat cushion of a seat. In a seat device, a seat cushion may be disposed on a seat pan, or a seat cushion may be disposed on a plurality of S springs fixed to a frame. In a seat device in which a seat cushion is disposed on a plurality of S springs, a load-detecting device may be engaged with the S springs. Patent Literature 1 listed below describes a sitting detection device as such a load-detecting device. The sitting detection device disclosed in Patent Literature 1 includes a base engaged with S springs and a membrane switch disposed on the base through a spacer.

[Patent Literature 1] JP2011-105278 A

SUMMARY OF INVENTION

In a typical seat device, a direction of a load applied to S springs from a seat cushion in a state where a person sits normally on the seat is a direction perpendicular to an S spring plane on which the respective S springs are located. This S spring plane is an imaginary plane, and normal sitting means sitting of a person with his/her buttock located backmost side of the seat surface and his/her back being in contact with the backrest. Therefore, the load-detecting device engaged with the S spring is configured to properly detect a load when the load-detecting device is pressed by the seat cushion in a direction perpendicular to the S spring plane. However, a sitting person may front-side sit, that is, a sitting person may sit on the front side comparing to the normal sitting, or a sitting person may side-shift sit, that is, a sitting person may sit in a state where the sitting person is shifted in the lateral direction from the normal sitting. In those cases, the lower surface of the seat cushion applies, to the S spring, force in a direction that is oblique to the S spring plane. Therefore, the load-detecting device that detects a load by being pressed by the seat cushion also receives force in a direction that is oblique to a pressure detection direction of the load-detecting device from the seat cushion.

When such application, to the load-detecting device, of force in a direction that is oblique to a direction of pressure to be detected by the load-detecting device is repeated, unexpected force may be applied to members included in the load-detecting device, and displacement may be caused between the members, which may deteriorate the sensing accuracy of a load. As a countermeasure, the load-detecting device may be structured such that force applied to the members included in the load-detecting device is reduced, However, it is concerned that the load-detecting device structured in this way may not be able to properly detect a load.

Therefore, an object of the present invention is to provide a load-detecting device capable of properly detecting a load and suppressing deterioration of detection accuracy.

In order to achieve the above-described object, the invention is a load-detecting device configured to be pressed by a seat cushion disposed on a plurality of S springs, the load-detecting device including: a base including a pair of engagement parts engaged with a pair of the S springs; and a load detection sensor unit that is mounted, on the base and includes a pair of electrodes, the electrodes facing each other and being brought into contact with each other by pressing force of the seat cushion when a load is detected, wherein a pressed surface of the load detection sensor unit that is pressed by the seat, cushion when a load is detected is located at the same height as or higher than upper ends of the respective S springs, with which the base is engaged, and a contact surface between the electrodes in pair is located lower than the upper ends of the respective S springs, with which the base is engaged.

When the base is engaged with the S springs, a part of the engagement parts of the base that is engaged with the S springs is located higher than the S springs. Accordingly, the lower surface of the seat cushion disposed on the S springs tends to deform larger locally at the engagement parts of the base engaged with the S springs than an area around the engagement part. However, even when the lower surface of the seat cushion is deformed as described above, a part of the lower surface of the seat cushion overlapping with the base hardly bends downward to a position lower than the upper ends of the S springs. Even when the part bends to a position lower than the upper ends of the S springs, force of the lower surface of the seat cushion pressing the load-detecting device is small. However, according to the load-detecting device of the present invention, the pressed surface pressed by the seat cushion is located at the same height as or higher than the upper ends of the S springs. Therefore, the pressed surface is properly pressed by the seat cushion and a load due to sitting or the like can be properly detected.

In addition, the contact surface between the electrodes in pair is located lower than the upper ends of the S springs. Force applied to a member located lower than the upper ends of the S springs as described above is force that passes through a space between the S springs in pair downward. Therefore, even when oblique force is applied from the lower surface of the seat cushion to the pressed surface located higher than the upper ends of the S springs, for example, force in a direction close to a direction perpendicular to the S spring plane is applied to a member located lower than the upper ends of the S springs. Accordingly, positional displacement and the like between members such as electrodes in pair located lower than the upper ends of the S springs can be suppressed. Therefore, the load-detecting device of the present invention can suppress deterioration of detection accuracy. This load detection device may detect a load applied to various seat cushions. For example, the load detection device may be disposed under a seat cushion of the seat device to detect a load due to sitting or may be disposed under a seat cushion of a nursing care bed to detect a load due to lying.

The pair of electrodes is preferably located between lower ends and the upper ends of the respective S springs, with which the base is engaged.

With such a structure, even when some load other than the seat cushion is applied to a space below the seat cushion, the S springs extending across the entire surface serve as a protective wall, and thus a load directly applied to the pair of electrodes can be reduced. Therefore, problems such as positional displacement and the like of the contact part can be prevented.

A mount surface on which the load detection sensor unit on the base is mounted is preferably located at the same height as or lower than the lower ends of the respective S springs, with which the base is engaged.

With such a structure, it is possible to suppress direct application of an oblique load applied from the upper side to the mount surface of the base and to a part in the vicinity of the mount surface of the load detection sensor unit more effectively. The load-detecting device is effective, for example, when an excessively large load is applied locally compared, with an assumed normal load such as when a person rides on a seat cushion with his/her whole weight on the knees.

The pressed surface when a load is detected is preferably located at the same height as or lower than upper ends of the pair of engagement parts.

In this case, when a load is detected, the seat cushion bends downward to a position at the same height as or lower than the upper ends of the engagement part to press the pressed surface. Since the upper ends of the engagement parts thus support the seat cushion, application of an excessive load to the pressed surface can be suppressed, and thus durability of the load-detecting device can be improved.

The pressed surface when a load is not detected is preferably located higher than the upper ends of the pair of engagement parts.

Since the pressed surface is located higher than the upper ends of the engagement parts when a load is not detected, the seat cushion can reliably press the pressed surface when the seat cushion begins to lower due to application of a load.

The pressed surface when a load is not detected is preferably located at the same height as or lower than the upper ends of the pair of engagement parts.

When a load is not detected, the pressed surface is located at the same height as or lower than the upper ends of the engagement parts, and when a load is detected, the pressed surface is at the same height as or higher than the upper ends of the S springs as described above. Accordingly, the stroke of the pressed surface moving during transition from a state where a load is not detected to a state where a load is detected is smaller than the upper thickness of an upper part of the S springs at the engagement parts. Therefore, the amount of deformation from the time when the bottom surface of the seat cushion comes into contact with the sensor until the sensor detects a load is extremely small. Therefore, the shape of the bottom surface of the seat cushion when a load is not applied is substantially the same as the shape of the bottom surface when a load is applied, and high performance stability to deformation of the seat cushion due to aging, which is so-called deterioration, can be exhibited.

An average height position of the lower surface of the seat, cushion is preferably located at the same height as or higher than the pressed surface when a load is not detected.

Since an average height position of the lower surface of the seat cushion is located at the same height as or higher than the pressed surface, even when a pressing mark is made by the load-detecting device because a state where a load is applied to the seat cushion and a state where a load is not applied to the seat cushion are repeated by repeated sitting, for example, the pressing mark can be suppressed from being excessive. Therefore, even when the pressing mark is made on the lower surface of the seat cushion, a load can be properly detected.

The load detection sensor unit may include a supporting member that supports the pair of electrodes on the base, and may include the pressed surface and a pressing member configured to press one of the electrodes in pair.

As described above, according to the present invention, there is provided a load-detecting device capable of properly detecting a load and suppressing deterioration of detection accuracy.

DESCRIPTION OF EMBODIMENTS

Hereinafter, preferred embodiments of a load-detecting device according to the present invention will be described in detail with reference to the drawings. For ease of understanding, the scale of respective drawings may be different from the scale described in the following description.

(First Embodiment)

Figure 1:
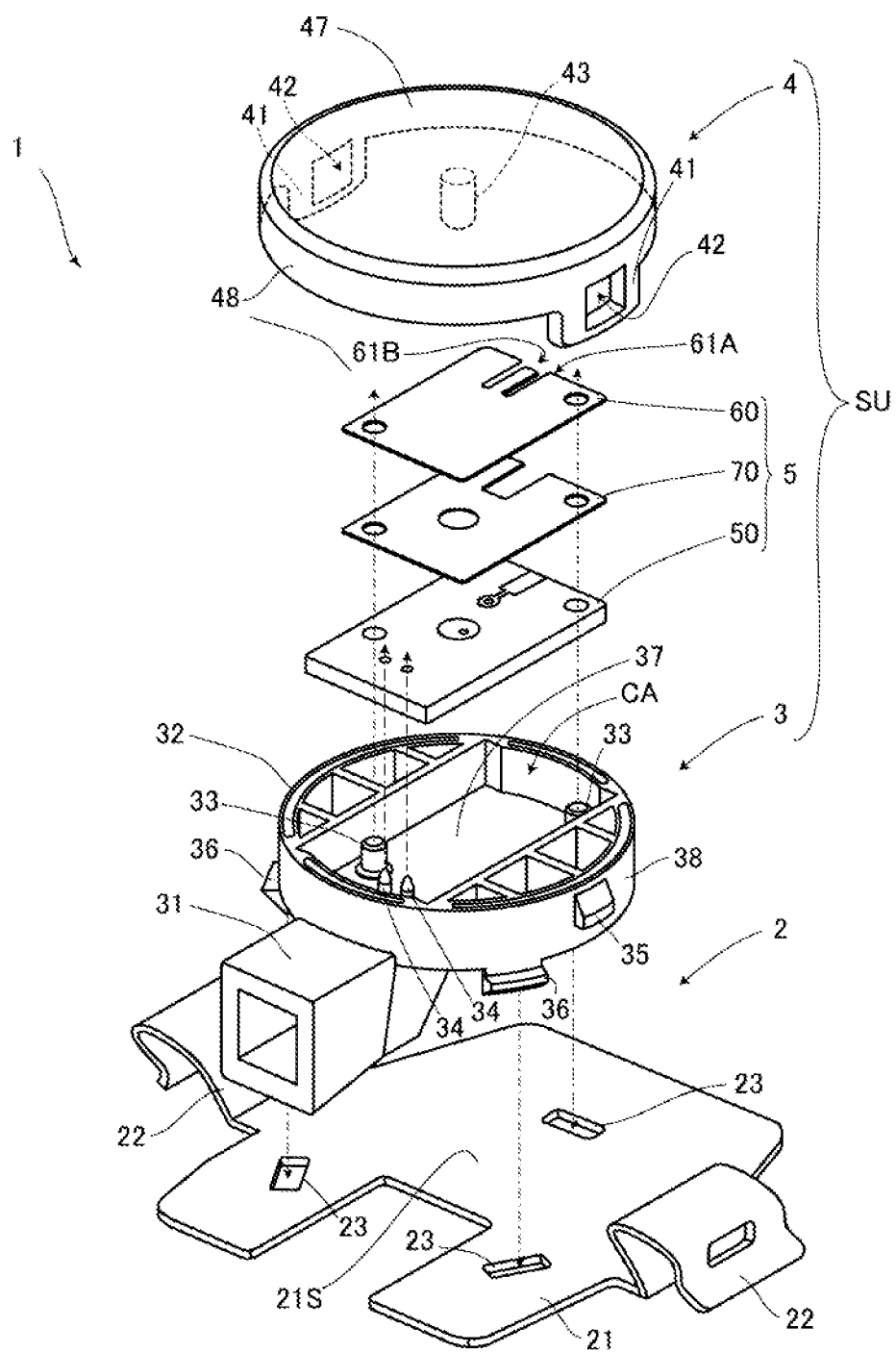
FIG. 1 is an exploded view illustrating a structure of a load-detecting device according to a first embodiment of a first embodiment.
Figure 2:
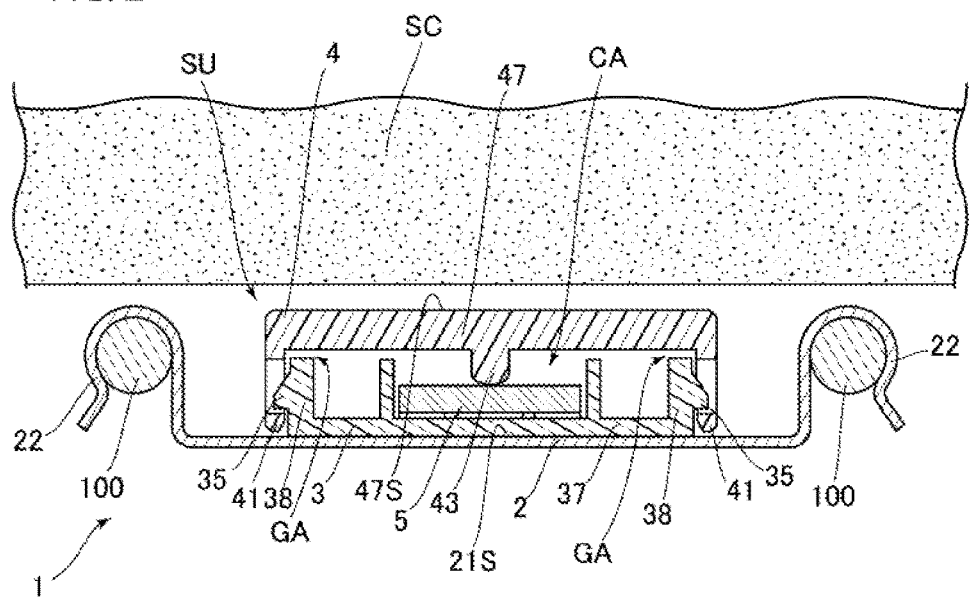
FIG. 2 is a cross sectional view illustrating the load-detecting device of FIG. 1 mounted on S springs.

FIG. 1 is an exploded view illustrating a structure of a load-detecting device according to the present embodiment, and FIG. 2 is a cross sectional view illustrating the load-detecting device 1 mounted on S springs of a seat device. In the present embodiment, an example in which a load-detecting device is used as a sitting detection device in a seat device will be described. FIG. 2 is a cross sectional view of the load-detecting device 1 in a plane along a right and left direction of the seat device. As illustrated in FIGS. 1 and 2, the load-detecting device 1 mainly includes a base 2 and a load detection sensor unit SU mounted on the base 2.

The base 2 includes a mount part 21 on which the load detection sensor unit SU is mounted and a pair of hook parts 22 linked to the mount part 21. The upper surface of the mount part 21 serves as a mount surface 21S on which the load detection sensor unit SU is mounted. In addition, a plurality of through holes 23 penetrating the mount part 21 from the mount surface 21S to a lower surface (the surface opposite to the mount surface 21S) of the mount part 21 is formed in the mount part 21. The base 2 is, for example, formed by shaping a metal plate, and in this case, the plate thickness is set to 0.8 mm, for example.

The hook parts 22 in pair are respectively provided at positions opposed to each other with the mount, part 21 between them, and are fitted on a pair of adjacent S springs 100 among the plurality of S springs 100 extending across an opening of a frame in the seat device of a vehicle. Therefore, each of the hook parts 22 is an engagement part for engaging the base 2 with the S springs 100. In the present embodiment, the hook parts 22 in pair are arranged in a lateral direction of the seat device and are formed so as to be fitted on the pair of S springs 100 adjacent in the lateral direction. In addition, in a state where the pair of hook parts 22 is fitted on the pair of adjacent S springs 100 in this manner, the mount part 21 is located below the seat cushion SC placed on the plurality of S springs 100, and the mount part 21 is located between the pair of S springs 100 when the plurality of S springs are viewed from above. In the state where the pair of hook parts 22 is fitted on the pair of S springs 100 as described above, the mount surface 21S is located lower than lower ends 102 of the respective S springs 100 in the present embodiment.

As illustrated in FIG. 1, the load detection sensor unit SU mainly includes a housing 3, a housing cover 4, and a load detection sensor 5.

As illustrated in FIGS. 1 and 2, the housing 3 includes a connector part 31 connected to a vehicle control unit (not illustrated) and a switch housing part 32 linked to the connector part 31. The switch housing part 32 includes a bottom wall 37 and a frame wall 38, and the bottom wall 37 and the frame wall 38 form a housing space CA for housing the load detection sensor 5. In the present embodiment, the frame wall 38 is lightened to suppress deformation during resin molding.

A pair of fixing pins 33 and a pair of connecting pins 34 are provided on the bottom wall 37 of the switch housing part 32. The fixing pins 33 in pair are pins each for fixing the load detection sensor 5 housed in the housing 3. The connecting pins 34 in pair are electrically connected to connector terminals of the connector part 31 and are electrically connected to the load detection sensor 5. Thus, the connecting pins 34 are pins each for electrically connecting the connector terminals and the load detection sensor 5. In FIG. 1, the connector terminal of the connector part 31 is not illustrated.

A pair of projecting pieces 35 is provided on the outer surface of the frame wail 38 of the switch housing part 32. In the present embodiment, the projecting pieces 35 in pair are provided so as to be arranged in the lateral direction of the seat. A plurality of hook pieces 36 is provided at a lower end of the frame wall 38. The hook pieces 36 are fitted into the respective through holes 23 of the base 2. The housing 3 is fixed to the base 2 by the respective hook pieces 36 fitted into the respective through holes 23 of the base 2, whereby the load detection sensor unit SU is mounted on the mount surface 21S of the base 2 as described above.

The housing cover 4 is a lid member that covers the housing space CA of the switch housing part 32, and has a top wall 47 and a frame wall 48. A pair of arms 41 is provided at the lower end of the frame wall 48 of the housing cover 4. Each of the arms 41 is formed with an opening 42 into which each of the projecting pieces 35 provided on the frame wall 38 of the switch housing part 32 of the housing 3 is fitted. When the projecting pieces 35 of the housing 3 are fitted into the respective openings 42 of the pair of arms 41, the housing cover 4 is engaged with the housing 3. Accordingly, in a state where the housing cover 4 is engaged with the housing 3, the arms 41 in pair sandwich the housing 3 in the lateral direction of the seat.

On the top wall 47 of the housing cover 4, there is provided a switch pressing part 43 projecting from an inner surface facing the bottom wall 37 of the switch housing part 32 of the housing 3. The switch pressing part 43 has a convex curved shape at its tip, and in a state where the housing cover 4 covers the housing 3 and the respective projecting pieces 35 are fitted into the respective openings 42, the tip is in contact with a switch of the load detection sensor 5. Examples of the material of the housing cover 4 include resins such as polycarbonate (PC), polyamide (PA), polybutylene terephthalate (PBT), phenol resin, epoxy resin and the like.

As illustrated in FIG. 2, the top wall 47 of the housing cover 4 and the frame wall 38 of the housing 3 are separated from each other to form a gap GA in such a state where the switch pressing part 43 of the housing cover 4 is in contact with the load detection sensor 5.

In a state where the load-detecting device 1 assembled in this way is mounted on the pair of S springs 100, an upper surface 47S of the top wall 47 of the housing cover 4 faces the seat cushion SC with a predetermined distance from the seat cushion. This upper surface 47S is planar. The upper surface 47S is a surface to be pressed by the seat cushion SC and can be considered as a pressed surface of the load-detecting device 1. In addition, the housing cover 4 can be considered as a pressing member because the switch pressing part 43 presses one electrode of a switch SW as described below.

Figure 3:
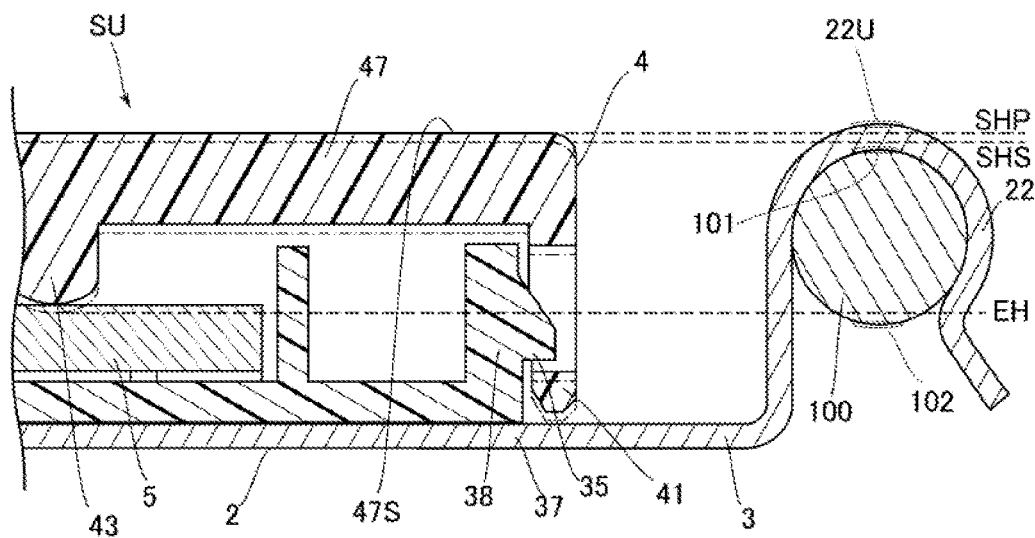
FIG. 3 is a partially enlarged view of FIG. 2.

FIG. 3 is a partial enlarged view of FIG. 2. As illustrated in FIG. 3, the upper surface 47S is located at a position higher than upper ends 101 of the S springs 100 as indicated by a broken line SHP, and in the present embodiment, the upper surface 47S is located at a position lower than the upper ends 22U of the hook parts 22, which are engagement parts, in a state where the upper surface 47S is not pressed, that is, a load due to sitting is not detected.

Note that a lower surface of the seat cushion SC is planar as illustrated in FIG. 2 in a state where the seat device is not used and the S springs 100 or the hook parts 22 are not marked on the lower surface of the seat cushion SC. On the other hand, the lower surface of the seat cushion SC is not planar in a state where the seat device is used and the S springs 100 and the hook parts 22 are marked on the lower surface of the seat cushion SC. Also in this case, an average height position of the lower surface of the seat cushion SC when a load is not detected is located higher than the upper surface 47S of the housing cover 4. Therefore, it is possible to suppress unnecessary pressing of the upper surface 47S of the housing cover 4 by the lower surface of the seat cushion SC.

Figure 4:
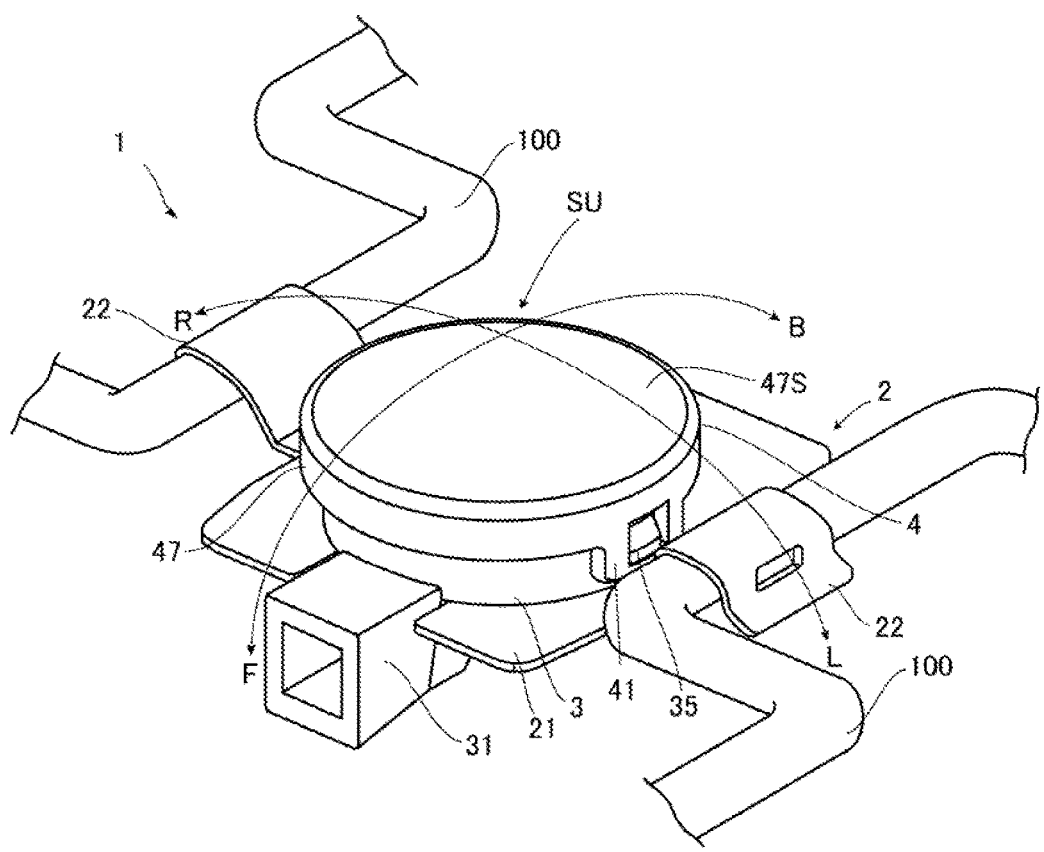
FIG. 4 is a perspective view illustrating the load-detecting device of FIG. 1 mounted on the S springs.
Figure 5:
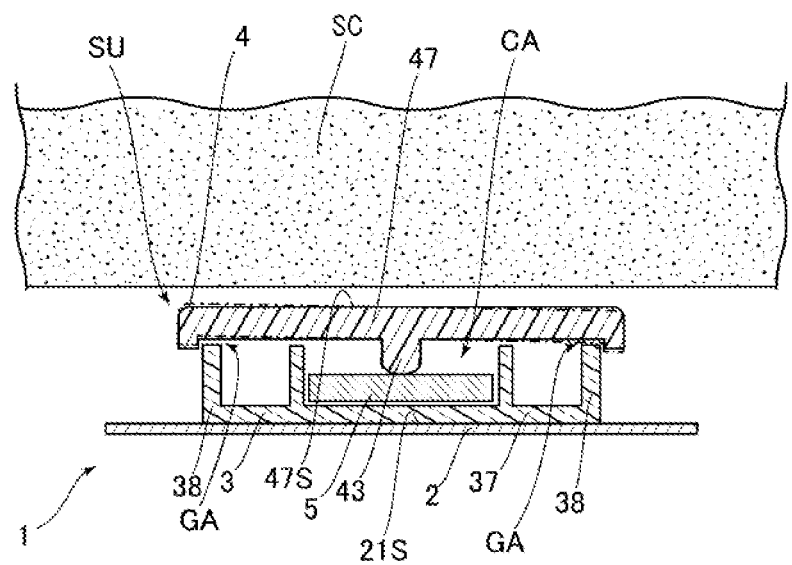
FIG. 5 is a cross sectional view of the load-detecting device of FIG. 1 on a plane along the front and back direction of a seat device.

FIG. 4 is a perspective view illustrating the load-detecting device 1 mounted on the S springs 100. FIG. 5 is a cross sectional view of the load-detecting device 1 along a front and back direction of the seat device. In FIG. 5, for ease of understanding, some members including members lower than the connector part 31 and the base 2 are not illustrated. As described above, the gap GA is formed between the top wall 47 of the housing cover 4 and the frame wall 38 of the housing 3 in a state where the tip of the switch pressing part 43 of the housing cover 4 is in contact with the load detection sensor 5. Therefore, the housing cover 4 can pivot in the F-B direction (front and back direction) indicated by an arrow in FIG. 4 so as to be inclined with the tip of the switch pressing part 43 as the center. In FIG. 5, inclination of the housing cover 4 in this manner is indicated by a one-dot chain line. Although not illustrated in FIG. 2 or FIG. 3, the housing cover 4 can also pivot in the R-L direction indicated by an arrow in FIG. 4 so as to be inclined with the tip of the switch pressing part 43 as the center. That is, the entire upper surface 47S of the housing cover 4 is inclined with respect to the mount surface 21S in the front and back direction and in the right and left direction so as to change an angle of the upper surface 47S with respect to the mount surface 21S when viewed along the direction of the mount surface 21S of the base 2. However, since the arms 41 in pair of the housing cover 4 sandwich the housing 3 in the lateral direction of the seat device as described above, the angle by which the housing cover 4 pivots is larger in the front and back direction than in the right and left direction of the seat. Since the upper surface 47S is not divided, the entire upper surface 47S moves.

Figure 6:
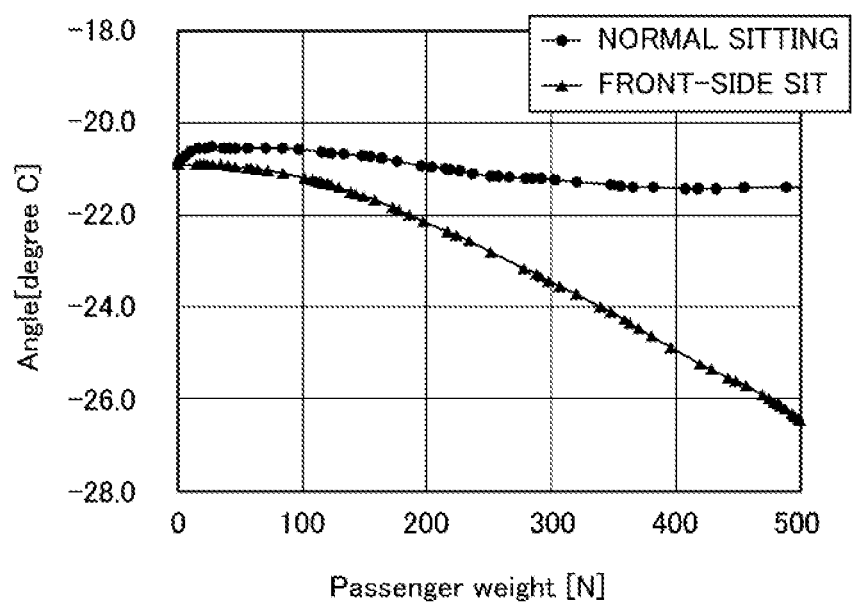
FIG. 6 is a diagram that illustrates the relationship between a load and an angle of a lower surface of a seat cushion with respect to the horizontal plane in cases where a person sitting on the seat device sits normally and a person front-side sits.

FIG. 6 is a diagram that illustrates the relationship between a load and an angle of the lower surface of the seat cushion with respect to the horizontal plane in cases where a person sitting on the seat device sits normally and a person front-side sits. As illustrated in FIG. 6, in the case of normal sitting, the angle of the lower surface of the seat cushion changes by 0.5 degrees or less to the front side or the back side from the initial state when a load is up to 500 N. It is considered that this tendency is not changed even if the load exceeds 500 N as long as a person sits normally. However, in the case of the front-side sitting, the angle of the lower surface of the seat cushion changes by about 5 degrees relative to the initial state when a load is up to 500 N. In addition, when the housing cover 4 pivots by more than 5 degrees from the initial state, strength deterioration of the load-detecting device 1 such as deformation of the switch pressing part 43 is concerned. Accordingly, it is preferable that the pivot angle of the housing cover 4 be set to 5 degrees or less. Therefore, it is preferable that the upper surface 47S of the housing cover 4 also pivot by 5 degrees or less. In normal sitting, as described above, the angle of the lower surface of the cushion sheet changes in a range less than 0.5 degrees to the front side or back side from the initial state. Accordingly, when the change in the inclination angle of the lower surface of the seat cushion is 0.5 degrees or more, there is a high possibility that a person sitting on the seat device front-side sits. Therefore, by pivoting the upper surface 47S of the housing cover 4 by an angle of 0.5 degrees or more from the initial state, the upper surface 47S can be inclined corresponding to at least part of change in the inclination angle of the lower surface of the seat cushion due to at least the front-side sit.

Next, the load detection sensor 5 housed in the switch housing part 32 of the housing 3 will be described.

Figure 7:
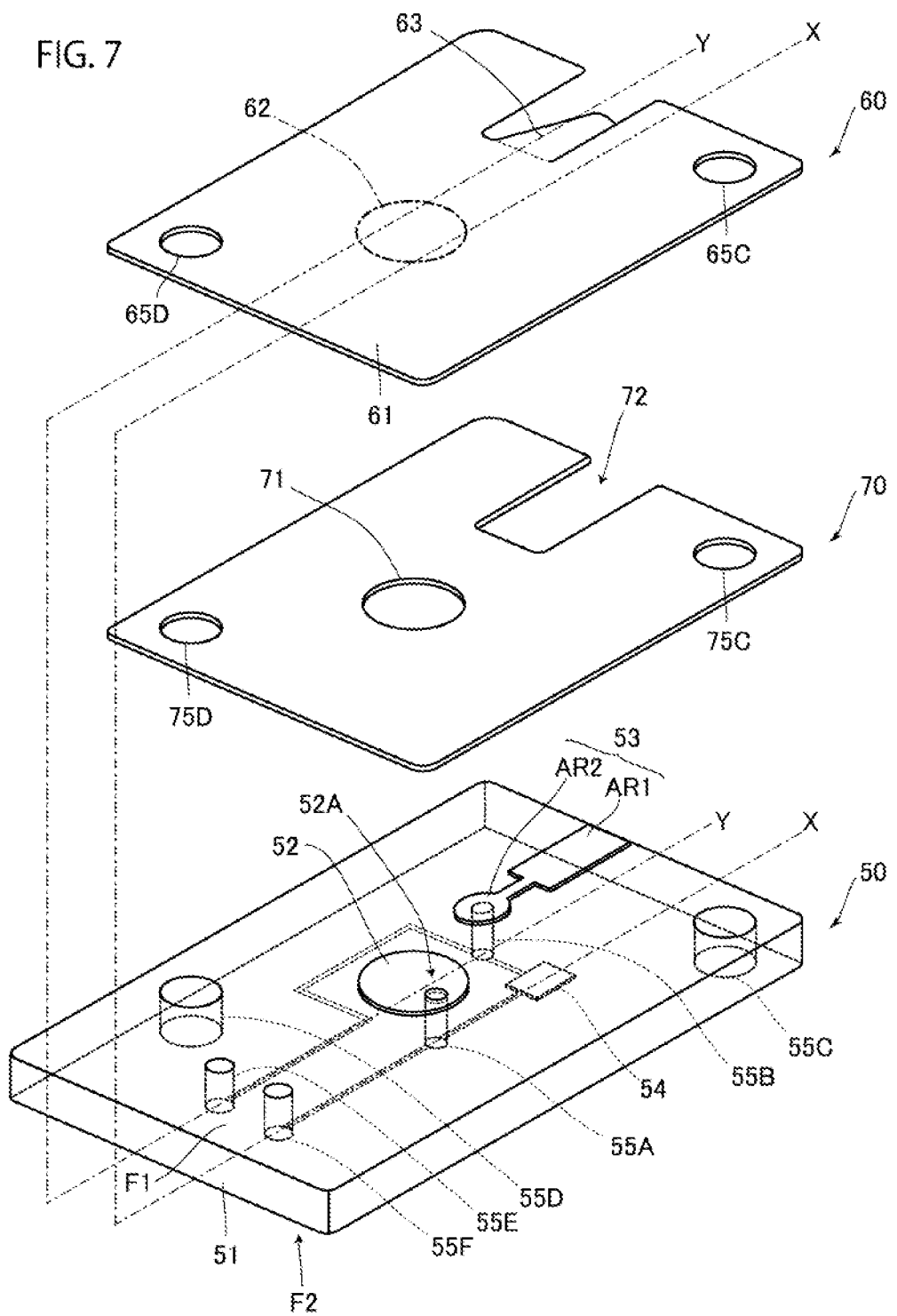
FIG. 7 is an exploded view illustrating a structure of the load detection sensor of FIG. 1.
Figure 8:
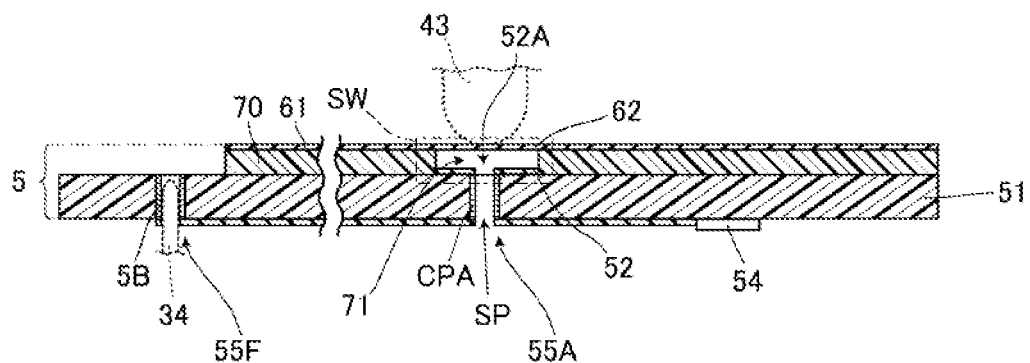
FIG. 8 is a cross sectional view of the load detection sensor taken along the line X-X illustrated in FIG. 7.

FIG. 7 is an exploded view illustrating a structure of the load detection sensor 5. FIG. 8 is a cross sectional view of the load detection sensor 5 taken along the line X-X illustrated in FIG. 7, and FIG. 9 is a cross sectional view of the load detection sensor 5 taken along the line Y-Y illustrated in FIG. 7.

Figure 9:
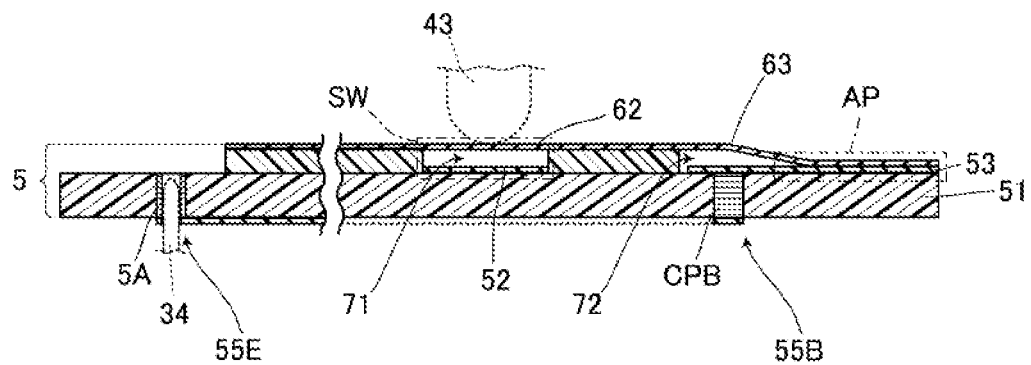
FIG. 9 is a cross sectional view of the load detection sensor taken along the line Y-Y illustrated in FIG. 7.

As illustrated in FIGS. 7 to 9, the load detection sensor 5 mainly includes a first electrode sheet 50, a second electrode sheet 60, and a spacer 70.

The first electrode sheet 50 includes, for example, an insulating substrate 51 having no flexibility. Examples of the material of the substrate 51 include phenol resin, epoxy resin and the like. On this substrate 51, a first electrode 52 and a first contact part 53 are disposed on one surface F1 facing the second electrode sheet 60.

The first electrode 52 is one of electrodes constituting the switch SW and is, for example, a circular metal printed layer. The first contact part 53 includes a substantially rectangular contact region AR1 that is in contact with the second electrode sheet 60 and a non-contact region AR2 that is not in contact with the second electrode sheet 60, and the regions are connected to each other.

The other surface F2 of the substrate 51 on the side opposite to the one surface F1 is a lower surface of the load detection sensor 5, and a resistor 54 is disposed on the other surface F2. The resistor 54 is a resistor for detecting disconnection, and in the present embodiment, the resistor 54 is constituted of a chip resistor.

A plurality of through holes penetrating from the one surface F1 to the other surface F2 of the substrate 51 are formed in the substrate 51, and are respectively referred to as a first sheet through hole 55A, a second sheet through hole 55B, fixing through holes 55C and 55D and pin through holes 55E and 55F.

The first sheet through hole 55A is a sheet through hole of which an opening is located in a region of the one surface F1 of the substrate 51 where the first electrode 52 is disposed. A first conductive member CPA is provided in the first sheet through hole 55A, and through the first conductive member CPA, a circuit part disposed on the other surface F2 of the substrate 51 and the first electrode 52 are electrically connected to each other. Accordingly, the first conductive member CPA and the resistor 54 are electrically connected, and as a result, the first electrode 52 and the resistor 54 are electrically connected. The first conductive member CPA is provided on the inner peripheral surface of the first sheet through hole 55A, and in the first sheet through hole 55A, an air hole SP surrounded by the first conductive member CPA is formed.

The second sheet through hole 55B is a sheet through hole of which an opening is located in a region of the one surface F1 of the substrate 51 where the first contact part 53 is disposed. In the present embodiment, the opening of the second sheet through hole 55B is located in the non-contact region AR2 of the first contact part 53.

The second sheet through hole 55B is filled with a second conductive member CPB. The circuit part disposed on the other surface F2 of the substrate 51 and the non-contact region AR2 of the first contact part 53 are electrically connected through the second conductive member CPB. On the other surface F2 of the substrate 51, the second conductive member CPB is connected to the resistor 54. Accordingly, the resistor 54 and the first contact part 53 are electrically connected. Since the first electrode 52 and the resistor 54 are electrically connected as described above, the first electrode 52, the resistor 54, and the first contact part 53 are electrically connected in series in this order.

The fixing through holes 55C and 55D are through holes through which the pair of fixing pins 33 provided on the bottom wall 37 of the switch housing part of the housing 3 is inserted. The diameter of the fixing through holes 55C and 55D have a diameter that is approximately the same as the outer diameter of the pair of fixing pins 33.

The pin through holes 55E and 55F are through holes through which the pair of connecting pins 34 provided on the housing 3 is inserted. Inside of the pin through hole 55E, a terminal 5A that is one end part of the electric circuit of the load detection sensor 5 is provided, and inside the pin through hole 55F, a terminal 5B that is the other end part of the electric circuit of the load detection sensor 5 is provided.

The terminal 5A is electrically connected to a contact point between the first electrode 52 and the resistor 54, and the terminal 5B is electrically connected to a contact part between the resistor 54 and the first contact part 53. The terminals 5A and 5B are provided along the inner peripheral surfaces of the corresponding pin through holes 55E and 55F. The width of a space surrounded by the terminals 5A and 5B is approximately the same as the outer diameter of the connecting pins 34. When the pair of connecting pins 34 is inserted through the pin through holes 55E and 55F, the terminal 5A and the one connecting pin 34 are electrically connected, and the terminal 5B and the other connecting pin 34 are electrically connected.

The second electrode sheet 60 mainly includes a metal sheet 61, a second electrode 62, and a second contact part 63.

The metal sheet 61 is a thin metal sheet having flexibility, and in the present embodiment, the metal sheet 61 has a thin rectangular parallelepiped shape having a longitudinal width smaller than the longitudinal width of the substrate 51 and a lateral width that is approximately the same as the lateral width of the substrate 51. The material of the metal sheet 61 is not particularly limited as long as it is a metal, but examples of the material include copper, stainless steel and the like.

In the metal sheet 61, fixing through holes 65C and 65D penetrating from one surface to the other surface of the metal sheet 61 are formed. The fixing through holes 65C and 65D are through holes through which the pair of fixing pins 33 provided on the bottom wall of the switch housing part of the housing 3 is inserted, and have the same shape and size as those of the fixing through holes 55C and 55D formed in the substrate 51 of the first electrode sheet 50. The positional relationship of parts where the second electrode 62 and the second contact part 63 are disposed with respect to the fixing through holes 65C and 65D and the positional relationship of parts where the first electrode 52 and the first contact part 53 are located with respect to the fixing through holes 55C and 55D are relatively the same. When the first electrode sheet 50 and the metal sheet 61 are stacked on each other, the fixing through hole 55C and the fixing through hole 65C are aligned with each other and the fixing through hole 55D and the fixing through hole 65D are aligned with each other.

The second electrode 62 is the other electrode of the electrodes constituting the switch SW, and in the present embodiment, the second electrode 62 is a part opposed to the first electrode 52 with the spacer 70 between them on the metal sheet 61. That is, a part of the metal sheet 61 also serves as the second electrode 62. For example, a metal layer made of the same material as or a different material from that of the metal sheet 61 may be disposed as a second electrode 62 at a part opposed to the first electrode 52 with the spacer 70 between them on the metal sheet 61.

The second contact part 63 is one of members constituting a connection maintaining part AP, and in the present embodiment, the second contact part 63 is formed as a plate spring. That is, a pair of cutouts 61A and 61B (FIG. 1) extending from one end toward the other end of the metal sheet 61 is formed in the metal sheet 61 with a predetermined gap between the cutouts 61A and 61B. A part between the cutouts 61A and 61B (FIG. 1) serves as the second contact part 63. In addition, the root of the second contact part 63 is bent toward the first electrode sheet 50 so that the second contact part 63 is inclined with respect to the sheet surface of the metal sheet 61, whereby the second contact part 63 is formed as a plate spring. As described above, on the metal sheet 61, a part different from the part serving as the second electrode 62 serves as the second contact part 63. The position where the second contact part 63 is formed is a position aligned with the contact region AR1 of the first contact, part 53 when the first, electrode sheet 50 and the second electrode sheet 60 are stacked on each other. The shape of the plate spring formed as the second contact part 63 may be, for example, a trapezoidal shape having a width at the root larger than the width at. the open end, and may be various shapes other than the rectangle or the trapezoid. A metal layer of the same material as or a different material from that of the metal sheet 61 may be disposed on the first electrode sheet 50 side of the metal sheet 61 as the second contact part 63.

The spacer 70 is a thin insulating member sandwiched between the first electrode sheet 50 and the second electrode sheet 60. In the present embodiment, the spacer 70 has substantially the same shape and size as those of the metal sheet 61 after elimination of the second contact part 63. Examples of the material of the spacer 70 include resins such as polyethylene terephthalate (PET), polyimide (PI) and polyethylene naphthalate (PEN).

An opening 71 is formed in this spacer 70. The opening 71 is formed at a position that is between the first electrode 52 disposed on the substrate 51 and the second electrode 62 of the metal sheet 61 facing the first electrode 52, and is aligned with the first electrode 52 and the second electrode 62 in the vertical direction. The size of the opening 71 is slightly smaller than the size of the first electrode 52.

In addition, a slit-like opening 72 is formed in the spacer 70. The opening 72 is formed at a position that is between the first contact part 53 disposed on the substrate 51 and the second contact part 63 of the metal sheet 61 facing the first contact part 53, and is aligned with the first contact part 53 and the second contact part 63 in the vertical direction. The size of the opening 72 is slightly larger than the size of the plate spring formed as the second contact part 63 in the metal sheet 61.

Further, in the spacer 70, fixing through holes 75C and 75D penetrating from one surface to the other surface of the spacer 70 are formed. The fixing through holes 75C and 75D are through holes through which the fixing pins 33 provided on the bottom wall of the switch housing part of the housing 3 are inserted, and have the same shape and size as those of the fixing through holes 55C and 55D formed in the substrate 51 of the first electrode sheet 50. The positional relationship of parts where the opening 71 and the opening 72 are formed with respect to the fixing through holes 75C and 75D on the spacer 70 and the positional relationship of the first electrode 52 and the first contact part 53 with respect to the fixing through holes 55C and 55D in the first electrode sheet 50 are relatively the same. Therefore, when the first electrode sheet 50, the spacer 70, and the second electrode sheet 60 are stacked on each other, the fixing through hole 55C, the fixing through hole 65C, and the fixing through hole 75C are aligned with each other, and the fixing through hole 55D, the fixing through hole 65D, and the fixing through hole 75C are aligned with each other.

The first electrode sheet 50, the second electrode sheet 60, and the spacer 70 as described above are stacked to form the load detection sensor 5. In the load detection sensor 5, as illustrated in FIG. 8, the first electrode 52 and the second electrode 62 face each other through the opening 71 to form the switch SW. In a state where the first electrode 52 and the second electrode 62 are separated from each other, the distance between the first electrode 52 and the second electrode 62 is, for example, 0.1 mm. Then, an air hole SP formed in an electrode through hole 52A communicates with the opening 71. Therefore, when the second electrode 62 bends and comes to contact with the first electrode 52, unnecessary air can be discharged through the air hole SP to the outside of the load detection sensor 5. As described above, the first sheet through hole 55A serves not only as a hole for electrically connecting the first electrode 52 disposed on the one surface F1 of the substrate 51 and the circuit part disposed on the other surface F2 side but also as an exhaust hole for discharging air in the opening 71 to the outside of the load detection sensor 5.

As described above, in the load detection sensor 5, the second contact part 63 of the second electrode sheet 60 is formed as a plate spring, and thus is plastically deformed so that the second contact part 63 is always inclined with respect to the sheet surface of the metal sheet 61. Therefore, as illustrated in FIG. 9, the second contact part 63 passes through the opening 72 formed as a cutout in the spacer 70 and is connected to the contact region AR1 of the first contact part 53 of the first electrode sheet 50. As described above, the first contact part 53 and the second contact part 63 contact with each other to form the connection maintaining part AP. In other words, the first contact part 53 of the first electrode sheet 50 is one of members constituting the connection maintaining part AP, which maintains electric connection even when no external pressure is applied to the housing cover 4 of the load detection sensor unit SU, and the second contact part 63 of the second electrode sheet 60 is the other member constituting the connection maintaining part AP.

The pair of fixing pins 33 of the housing 3 are inserted through the fixing through holes 55C and 55D of the first electrode sheet 50, the fixing through holes 75C and 75D of the spacer 70, and the fixing through holes 65C and 65D of the second electrode sheet 60 in this order as illustrated in FIG. 1, so that the load detection sensor 5 is fixed to the housing 3. At this time, the substrate 51 and the bottom wall 37 of the housing 3 are located between the first electrode 52 and the mount surface 21S of the base 2. Therefore, the substrate 51 and the bottom wall 37 can be considered as supporting members that support the first electrode 52 on the base 2 respectively. In a state where the load detection sensor 5 is fixed to the housing 3, and the housing 3 is mounted on the base 2 as the approximate heights of the first electrode 52 and the second electrode 62 are indicated by a broken line EH in FIG. 3, the first electrode 52 and the second electrode 62 are located at heights between the lower ends 102 and the upper ends 101 of the respective S springs 100, with which the base 2 is engaged.

Further, in a state where the load detection sensor 5 is fixed to the housing 3, the pair of connecting pins 34 is inserted into the pin through holes 55E and 55F of the first electrode sheet 50. As a result, the terminals 5A and 5B provided inside the pin through holes 55E and 55F come into contact with the corresponding connecting pins 34 and are electrically connected to the connector terminals of the connector part 31 of the housing 3 through the connecting pins 34. When the housing cover 4 is mounted, the tip of the switch pressing part 43 comes into contact with a side opposite to the first electrode 52 side of the second electrode 62 in the switch SW as described above.

Figure 10:
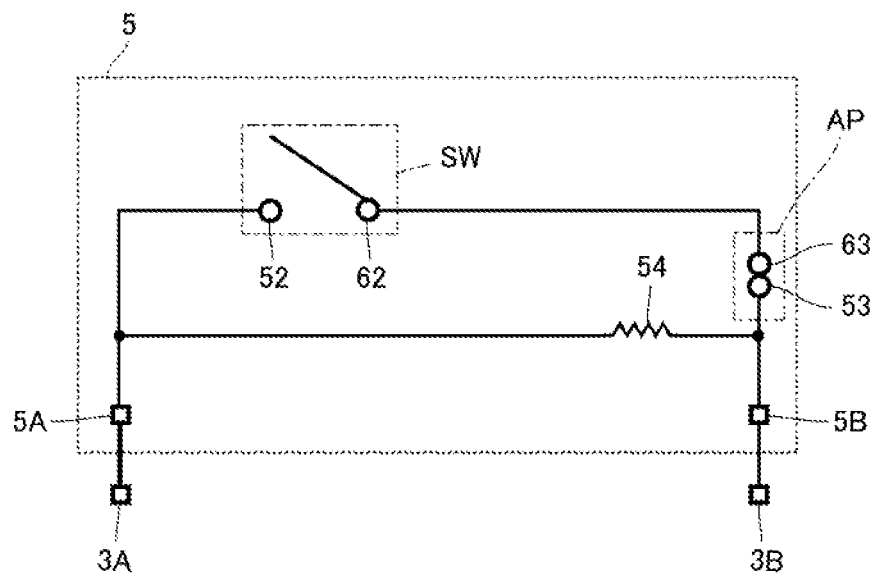
FIG. 10 is a diagram that illustrates an equivalent circuit of the load detection sensor of FIG. 7.

FIG. 10 is a diagram that illustrates an equivalent circuit of the load detection sensor 5 fixed to the housing 3. As illustrated in FIG. 7, the switch SW (the first electrode 52 and the second electrode 62) and the connection maintaining part AP (the first contact part 53 and the second contact part 63) are connected between the terminals 5A and 5B in pair that are circuit ends of the load detection sensor 5. The switch SW is electrically connected between the terminals 5A and 5B in pair and is connected to the connector terminals 3A and 3B provided on the connector part 31 of the housing 3 through the pair of terminals 5A and 5B. Since the resistor 54 is electrically connected to the first electrode 52 and the first contact part 53 as described above, the resistor 54 is connected to the switch SW electrically in parallel. Therefore, when the switch SW is turned on, the resistance value between the terminals 5A and 5B decreases from the resistance value when the switch SW is OFF.

Next, detection of a load due to sitting will be described.

When a person sits on the seat device, the lower surface of the seat cushion SC moves downward due to the load of the person. At this time, the lower surface of the seat cushion SC may be inclined with respect to the S spring plane including the respective S springs 100 due to the load of the person. In the present embodiment, the lower surface of the seat cushion SC comes into contact with the upper ends 22U of the pair of hook parts 22. Accordingly, even if the lower surface of the seat cushion SC is inclined with respect to the S spring plane as described above, the upper ends 22U of the pair of hook parts 22 press the lower surface of the seat cushion SC, whereby inclination of the lower surface of the seat cushion SC can be suppressed to some extent.

When the lower surface of the seat cushion SC moves further downward, the lower surface of the seat cushion SC comes into contact with the upper surface 47S of the housing cover 4 while being deformed by being pressed against the upper ends 22U of the pair of hook parts 22. At this time, the lower surface of the seat cushion SC may be inclined to some extent even though the inclination is suppressed as described above. In this case, the lower surface of the seat cushion SC is also inclined with respect to the mount surface 21S of the base 2 engaged with the S springs 100, and thus also inclined with respect to the upper surface 47S of the housing cover 4 of the load detection sensor unit SU fixed on the mount surface 21S.

When the lower surface of the seat cushion SC moves further downward, the lower surface of the seat cushion SC presses the upper surface 47S of the housing cover 4. At this time, when the lower surface of the seat cushion SC is inclined with respect to the upper surface 47S of the housing cover 4 as described above, the housing cover 4 can pivot so as to be inclined with the tip of the switch pressing part 43, which is in contact with the load detection sensor 5, as the center. Thus, the upper surface 47S moves so as to change the angle with respect to the mount surface 21S. Therefore, the upper surface 47S of the housing cover 4 can make surface contact with the lower surface of the seat cushion SC.

When the lower surface of the seat cushion SC moves further downward, the housing cover 4 moves downward within the gap GA since the gap GA is formed between the housing cover 4 and the housing 3 as described above.

Figure 11:
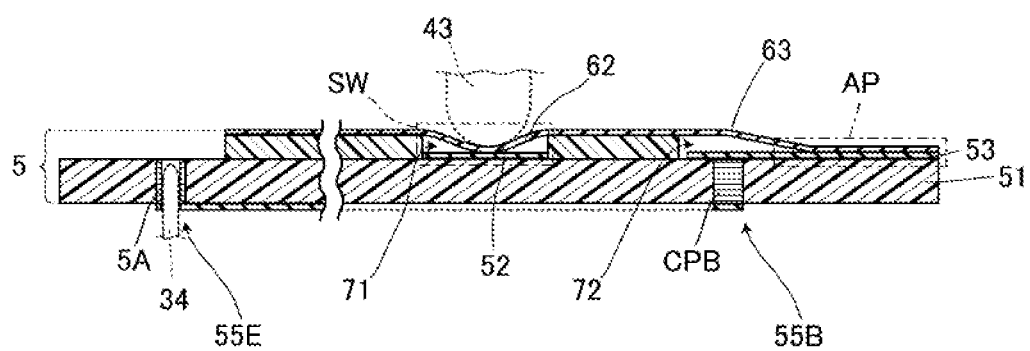
FIG. 11 is a view that illustrates an OK state of the load-detecting device of FIG. 7.

FIG. 11 is a view that illustrates an ON state of the load detection sensor 5. As a result of the downward movement of the housing cover 4 that can be considered as a pressing member as described above, the tip of the switch pressing part 43 presses the second electrode 62, and as illustrated in FIG. 11, the second electrode 62 comes into contact with the first electrode 52, so that the switch SW of the load detection sensor 5 is turned on. Therefore, the resistance value between the terminals 5A and 5B in pair becomes low, and this change in resistance value is detected by the vehicle control unit (not illustrated) through the connector terminals 3A and 3B. Sitting is detected in this way.

Meanwhile, in FIG. 3, a state where the housing cover 4 moves downward as described above and a load due to sitting is detected is indicated by a one-dot chain line. However, in order to avoid complications of the drawing, the state where the switch SW of the load detection sensor 5 is on is not illustrated in FIG. 3. Since the first electrode 52 is provided on the substrate 51 as described above, the first electrode 52 hardly bends. Therefore, the position of the contact surface between the first electrode 52 and the second electrode 62 when a load is detected substantially matches with the position of the surface of the first electrode 52 on the second electrode 62 side when a load is not detected. The height of the contact surface between the first electrode 52 and the second electrode 62 when a load is detected is the height of the broken line EH as illustrated in FIG. 3, and is located lower than the upper ends 101 of the respective S springs 100 and is located between the upper ends 101 and the lower ends 102.

When a load is detected, the upper surface 47S of the housing cover 4 of the load detection sensor unit SU is located at a position higher than the upper ends 101 of the respective S springs 100 with which the respective, hook parts 22 of the base 2 are engaged as indicated by a broken line SHS in FIG. 3. In addition, at this time, the upper surface 47S of the housing cover 4 is located lower than the upper ends 22U of the respective hook parts 22 that are engaged with the respective S springs 100 of the base 2. As described above, in the present embodiment, the upper surface 47S of the housing cover 4 is located lower than the upper ends 22U of the hook parts 22 in a state where a load is not detected. Therefore, the housing cover 4 moves within the plate thickness at the upper ends 22U of the hook parts 22 during a stage of transition from a state where a load is not detected to a state where a load is detected. That is, a movement stroke of the upper surface 47S of the housing cover 4 is made smaller than the plate thickness of the upper ends 22U of the hook parts 22.

As described above, the load-detecting device 1 of the present embodiment includes the base 2 engaged with a pair of S springs 100 and the load detection sensor unit SU. The load detection sensor unit SU includes the first electrode 52 and the second electrode 62 that are electrodes in pair, that face each other, and that come to contact with each other due to pressing force of the seat cushion SC when a load is detected. The upper surface 47S which is a pressed surface of the load detection sensor unit SU pressed by the seat cushion SC when a load is detected is located at the same height as or higher than the upper ends 101 of the respective S springs 100, with which the base 2 is engaged, and the contact surface between the electrodes in pair is located lower than the upper ends 101 of the respective S springs 100, with which the base 2 is engaged.

The lower surface of the seat cushion SC disposed on the S springs 100 tends to deform larger locally at the hook parts 22 of the base 2 engaged with the S springs 100 than an area around the hook parts 22. However, even when the lower surface of the seat cushion SC is deformed as described above, a part of the lower surface of the seat cushion SC overlapping with the base 2 hardly bends downward to a position lower than the upper ends 101 of the S springs 100. Even when the part bends to a position lower than the upper ends 101 of the S springs 100, force of the lower surface of the seat cushion SC pressing the load-detecting device 1 is small. However, according to the load-detecting device 1 of the present embodiment, the upper surface 47S pressed by the seat cushion SC is located higher than the upper ends 101 of the S springs 100 as described above. Therefore, the upper surface 47S is properly pressed by the seat cushion SC and a load due to sitting can be properly detected.

The contact surface between the electrodes in pair, which are the first electrode 52 and the second electrode 62, is located lower than the upper ends 101 of the S springs 100. Therefore, the supporting member such as the housing 3 and the substrate 51 that supports the pair of electrodes on the base 2 is also located lower than the upper ends 101 of the S springs 100. Force applied to the supporting member located lower than the upper ends 101 of the S springs 100 as described above is force that passes through a space between the upper ends 101 of the S springs 100 in pair, with which the base 2 is engaged, downward. Therefore, even when oblique force is applied from the lower surface of the seat cushion SC to the upper surface 47S of the housing cover 4 located higher than the upper ends 101 of the S springs 100, for example, force in a direction close to a direction perpendicular to the S spring plane consisted of respective S springs 100 is applied to supporting members located lower than the upper ends 101 of the S springs 100. Therefore, positional displacement and the like between supporting members located lower than the upper ends 101 of the S springs 100 can be suppressed. Therefore, the load-detecting device 1 of the present embodiment can suppress deterioration of detection accuracy.

In the load-detecting device 1 of the present embodiment, the first electrode 52 and the second electrode 62 are located between the lower ends 102 and the upper ends 101 of the respective S springs 100, with which the base 2 is engaged. Since the pair of electrodes is located at such a height position, even when some load is applied to a space below a seat pad, the S springs extending across the entire surface serve as a protective wall, and thus a load directly applied to the contact part can be reduced as much as possible. Therefore, problems such as positional displacement and the like of the contact part can be prevented.

In the load-detecting device 1 of the present embodiment, the mount surface 21S of the base 2, on which the load detection sensor unit SU is mounted, is located lower than the lower ends 102 of the respective S springs 100, with which the base 2 is engaged. Therefore, it is possible to suppress direct application of an oblique load applied from the upper side to the mount surface 21S of the base 2 and to a part in the vicinity of the mount surface 21S of the load detection sensor unit SU more effectively. The load-detecting device 1 is effective, for example, when an excessively large load is applied locally, for example, in a case where an occupant rides on a seat surface with his/her whole weight on the knees compared with an assumed normal sitting. The mount surface 21S may be at the same height as the lower ends 102 of the S springs 100 though this is different from the above-described embodiment.

In addition, the upper surface 47S of the housing cover 4 is located lower than the upper ends 22U of the hook parts 22, with which the S springs 100 of the base 2 are engaged, when a load due to sitting is not detected. Therefore, when a load is detected, the seat cushion SC bends downward to a position lower than the upper ends 22U of the hook parts 22 to press the upper surface 47S of the housing cover 4. Therefore, inclination of the seat cushion SC with respect to the S spring plane can be suppressed, and application of an excessive load on the upper surface 47S can be suppressed. Accordingly, durability of the load-detecting device 1 can be improved. Meanwhile, the upper surface 47S of the housing cover 4 when a load is not detected can be located at the same height as the upper ends 22U of the hook parts 22 though this is different from the present embodiment. Also in this case, application of an excessive load to the upper surface 47S can be suppressed, and the durability of the load-detecting device 1 can be improved. In addition, the amount of deformation from the time when the bottom surface of the seat cushion SC comes into contact with the load detection sensor unit SU until the load detection sensor unit SU detects the load can be extremely small. Therefore, the shape of the bottom surface of the seat cushion SC when a load is not applied is substantially the same as that when a load is applied, and high performance stability to deformation of the seat cushion SC due to aging, which is so-called deterioration, can be exhibited.

In the load-detecting device 1 of the present embodiment, the angle of the upper surface 47S of the housing cover 4, which is a pressed surface pressed by the seat cushion SC, with respect to the mount surface 21S of the base 2 changes. Therefore, even the lower surface of the seat cushion SC lowers while changing the degree of inclination of the lower surface, the upper surface 47S can follow the inclination. Therefore, the upper surface 47S is properly brought into surface contact with the lower surface of the seat cushion SC and pressed by the lower surface. Therefore, according to the load-detecting device of the present embodiment, it is possible to properly detect a load due to sitting.

In the load-detecting device 1 of the present embodiment, the housing cover 4 inclines larger in the front and back direction than in the right and left direction of the seat device. That is, the amount of change in the angle of the upper surface 47S of the housing cover 4 with respect to the mount surface 21S is larger in the front and back direction than in the right and left direction of the seat device. Meanwhile, individual differences of sitting positions between sitting persons are generally larger in the front and back direction than in the right and left direction. Therefore, the angle of the lower surface of the seat cushion tends to change largely in the front and back direction than in the right and left direction. However, since the amount of change in the angle between the upper surface 47S and the mount surface 21S is larger in the front and back direction than in the right and left direction of the seat device as described above, the upper surface 47S can follow the inclination of the lower surface of the seat cushion SC. Therefore, a load due to sitting can be detected more properly.

In the load-detecting device 1 of the present embodiment, the load detection sensor unit SU includes the switch pressing part 43, which is a shaft part that is integrated with the upper surface 47S of the housing cover 4 and extends from the upper surface 47S toward the mount surface 21S side of the base 2, and the upper surface 47S pivots as the tip of the switch pressing part 43 as the center. Therefore, the angle of the upper surface 47S of the housing cover 4 can be properly changed while simplifying the structure of the load detection sensor unit SU. In addition, since the switch pressing part 43, which is a shaft part, extends toward the mount surface 21S side of the base 2 and the upper surface 47S pivots with the tip of the switch pressing part 43 as the center, the switch pressing part 43 does not directly receive a load but the upper surface 47S, which is the pressed surface of the load detection sensor unit SU, receives pressing force. Thus, the switch pressing part 43 can pivot while friction between the bottom surface of the seat cushion SC and the upper surface 47S of the load detection sensor unit SU is suppressed. Further, in the load-detecting device 1 of the present embodiment, the switch pressing part 43, which is a shaft part, presses the second electrode 62 at the tip of the switch pressing part 43. That is, the shaft part also serves as a pressing part configured to press the electrode. Therefore, as compared with a case where a member configured to press the electrode and a shaft part are formed as separate members, the number of parts can be reduced and manufacturing cost can be reduced.

In the load detection sensor 5 of the present embodiment, the circuit part formed on the first electrode sheet 50 and the circuit part formed on the second electrode sheet 60 are always in a conductive state through the first contact part 53 of the first electrode sheet 50 and the second contact part 63 of the second electrode sheet 60. Therefore, each of the terminals 5A and 5B in pair can be disposed on the first electrode sheet 50. Accordingly, the load detection sensor 5 allowing a pair of terminals to be disposed on the first electrode sheet 50 is provided.

In the load detection sensor 5 of the present embodiment, a part of the second electrode sheet 60 including the second contact part 63 is formed as a plate spring configured to press the second contact part 63 against the first contact part 53. Therefore, an additional member for maintaining the first contact part 53 and the second contact part 63 always in a connected state can be made unnecessary. Accordingly, it is possible to suppress an increase in the number of parts and to reduce the size.

In the load detection sensor 5 of the present embodiment, the second electrode sheet 60 is made of the metal sheet 61. Therefore, the influence of heat on the second electrode sheet 60 is small, and thus the sensitivity of the load detection sensor 5 is stabilized even when the load detection sensor 5 is used in high temperature environment or low temperature environment. In addition, since the second electrode sheet 60 is made of metal, breakage or the like can be reduced and durability can be improved. Furthermore, since the second contact part 63, which is formed as a plate spring in the second electrode sheet 60, is also made of metal, malleability and ductility of. the second contact part 63 formed as the plate spring can be increased compared with a case where a part of the resin sheet is formed as a plate spring. Therefore, damage such as breakage of the second contact part. 63 formed as a plate spring can be reduced, and durability of the plate spring can be improved.

In the load detection sensor 5 of the present embodiment, the substrate 51, which is a sheet, of the first electrode sheet 50, has the first sheet through hole 55A penetrating from the one surface F1 facing the second electrode sheet 60 to the other surface F2. In addition, the first electrode 52 is electrically connected to the circuit part disposed on the other surface F2 of the substrate 51 through the first, conductive member CPA provided in the first sheet through hole 55A. Therefore, it is possible to take out. the one terminal 5A to the other surface F2 of the substrate 51. As in the present embodiment, the terminal 5A may be disposed inside the pin through hole 55E other than the first sheet through hole 55A. Therefore, it becomes easy to connect the load detection sensor unit SU to another electronic part such as the connector part 31. In addition, since the circuit part can be provided on the other surface F2, it is not necessary to provide a circuit part on the one surface F1, allowing reduction of unevenness due to the circuit part on the one surface F1. Thus, the sensitivity of the load detection sensor 5 can be stabilized.

In the load detection sensor 5 of the present embodiment, the opening of the first sheet through hole 55A on the one surface side is located in the region of the one surface F1 of the substrate 51 where the first electrode 52 is disposed. The first sheet through hole 55A has the air hole SP communicating with the opening 71 between the first electrode 52 and the second electrode 62 through the electrode through hole 52A provided in the first electrode 52. Therefore, the first sheet through hole 55A serves not only as a connecting hole for electrically connecting the first electrode 52 disposed on one the surface F1 of the substrate 51 and the circuit part on the other surface side of the substrate 51 but also as an exhaust hole for discharging air in the spacer to the outside. Therefore, the durability of the substrate 51 can be improved as compared with a case where a connection hole and an exhaust hole are separately formed. In addition, it is unnecessary to additionally form an exhaust hole, thereby saving space.

In the load detection sensor 5 of the present embodiment, the substrate 51, which is a sheet of the first electrode sheet 50, has the second sheet through hole 55B penetrating from the one surface F1 facing the second electrode sheet 60 to the other surface F2 at a position different from the position of the first sheet through hole 55A. In addition, the first contact part 53 is electrically connected to the circuit part disposed on the other surface F2 of the substrate 51 through the second conductive member CPB provided in the second sheet through hole 55B. Therefore, it is possible to take out the pair of terminals 5A and 5B to the other surface F2 of the substrate 51. As in the present embodiment, the terminals 5A and 5B may be disposed inside the pin through holes 55E and 55F other than the first sheet through hole 55A. Therefore, it becomes easy to connect the load detection sensor unit SU to another electronic part such as the connector part 31. In addition, since the circuit part can be provided on the other surface F2, it is not necessary to provide a circuit part on the one surface F1, allowing reduction of unevenness due to the circuit part on the one surface F1. Thus, the sensitivity of the load detection sensor 5 can be stabilized.

The load detection sensor 5 of this embodiment includes the resistor 54 that is disposed on the other surface F2 of the substrate 51 and that connects the first electrode 52 and the first contact part 53. Therefore, even when the thickness of the resistor 54 is large, deterioration of the sensitivity of the load-detecting device 1 due to the thickness can be avoided.

In this embodiment, the circuit part and the resistor 54 on the first electrode sheet 50 are provided on the other surface F2 of the substrate 51, and the pair of terminals 5A and 5B is provided in the pin through holes 55E and 55F. Accordingly, parts other than the first electrode 52 and the first contact part 53 can be eliminated from the one surface F1 of the substrate 51. Therefore, unevenness due to other parts can be eliminated on the one surface F1 of the substrate 51, and the sensitivity of load-detecting device 1 can be further improved.

(Second Embodiment)

Next, a second embodiment of the present invention will be described. In description of the present embodiment, components same as or similar to those of the first embodiment are followed by the same reference signs as those of the first embodiment, and redundant description thereof is not provided unless such components are particularly described.

Figure 12:
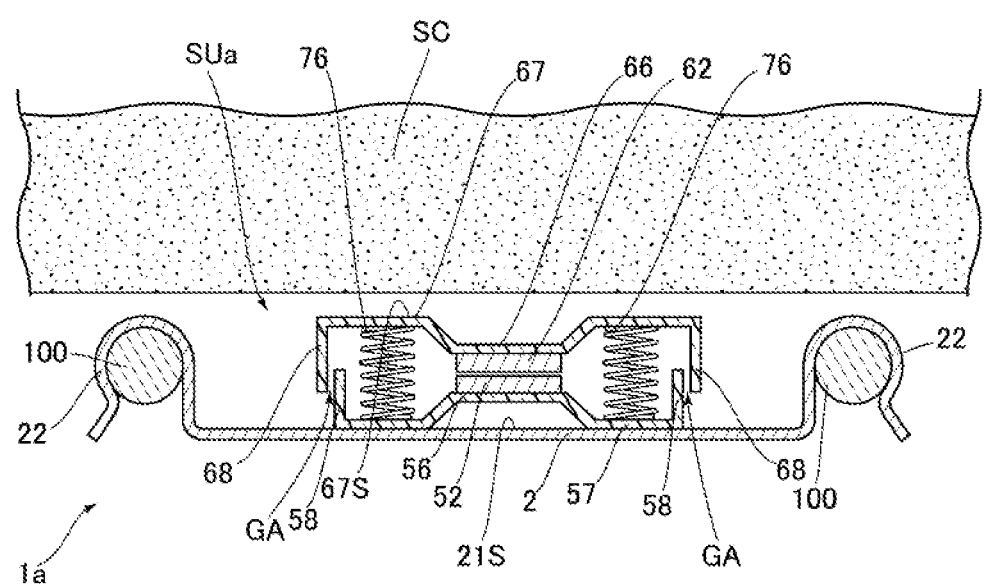
FIG. 12 is a view illustrating a load-detecting device according to a second embodiment of the present invention.

FIG. 12 is a view illustrating a second embodiment of a load-detecting device of the present invention. As illustrated in FIG. 12, a load-detecting device 1a according to the present embodiment includes a base 2 and a load detection sensor unit SUa different from the load detection sensor unit SU of the first embodiment. The load detection sensor unit SUa is mounted on a mount surface 21S of the base 2. The load detection sensor unit SUa according to the present embodiment includes a lower frame 56, an upper frame 66, a pair of electrodes 52 and 62, and a plurality of spring members 76 including coil springs.

The lower frame 56 has a bottom wall 57 and a frame wall 58. The bottom wall 57 is shaped such that the outer peripheral part thereof is in contact with the mount surface 21S of the base 2 and the central part thereof is raised so as to be separated from the mount surface 21S. The frame wall 58 is connected to the outer periphery of the bottom wall 57, and the frame wall 58 rises perpendicularly to the mount surface 21S of the base 2. The first electrode 52 is provided on the upper surface of the central part of the bottom wall 57. The first electrode 52 has, for example, a similar structure as the first electrode 52 of the embodiment described above.

The upper frame 66 has a top wall 67 and a frame wall 68. The substantial shape of the top wall 67 is a shape of the bottom wall 57 of the lower frame 56 inverted upside down. The frame wall 68 is connected to the outer periphery of the top wall 67, and the frame wall 68 hangs down toward the mount surface 21S of the base 2 so as to surround the outer peripheral surface of the frame wall 58 of the lower frame 56. However, a gap GA is provided between the frame wall 58 of the lower frame 56 and the frame wall 68 of the upper frame 66. The second electrode 62 is provided on the lower surface of the central part of the top wall 67. The second electrode 62 has a structure similar to that of the first electrode 52 in the above-described embodiment.

The outer peripheral part of the bottom wall 57 of the lower frame 56 and the outer peripheral part of the top wall 67 of the upper frame 66 are connected by the plurality of spring members 76. The upper frame 66 is supported by the plurality of spring members 76 in a state where the first electrode 52 and the second electrode 62 are separated from each other. In a state where the upper frame 66 is supported as described above, an upper surface 67S of the outer peripheral part of the top wall 67 faces the lower surface of a seat cushion SC with a predetermined distance between them. The upper surface 67S has a planar doughnut shape. The upper surface 67S is a surface to be pressed by the seat cushion SC and is a pressed surface of the load-detecting device according to the present embodiment.

In the present embodiment, the gap GA is provided between the frame wall 58 of the lower frame 56 and the frame wall 68 of the upper frame 66 as described above. Accordingly, the upper frame 66 can be inclined with respect to the lower frame 56 within the gap GA, thus, when viewing the load-detecting device 1a along the direction of the mount surface 21S of the base 2. The upper frame 66 including the upper surface 67S can move with respect to the mount surface 21S such that the angle of the upper surface 67S of the upper frame 66 with respect to the mount surface 21S changes.

The load-detecting device 1 of the first embodiment is structured such that the upper surface 47S pivots to be inclined with the tip of the switch pressing part 43 as the center. On the other hand, when the upper surface 67S of the upper frame 66, which is a pressed surface of the load-detecting device 1a according to the present embodiment, moves so as to be inclined with respect to the mount surface 21S, no reference point is particularly set. Also in the present embodiment, the load-detecting device 1a may be structured such that the amount of change in the angle of the upper surface 67S of the upper frame 66 with respect to the mount surface 21S is larger in the front and back direction than in the right and left direction of the seat device similarly to the first embodiment. In this case, the gap GA between the frame wall 68 of the upper frame 66 and the frame wall 58 of the lower frame 56 should be larger in the front and back direction than in the right and left direction.

Also in this load-detecting device 1a, the upper surface 67S of the upper frame 66 is located at a position at the same height as the height indicated fay the broken line SHP in FIG. 3 in a state where a load due to sitting is not detected. In a state where a load is detected, the upper surface 67S of the upper frame 66 is located at a position at the same height as the height indicated by the broken line SHS in FIG. 3, and the contact surface between the first electrode 52 and the second electrode 62 is located at a height same as the broken line EH in FIG. 3.

Even in the load-detecting device 1a having such a structure, the upper surface 67S can follow the inclination of the lower surface of the seat cushion SC when the lower surface lowers while changing the inclination of the lower surface. Therefore, the upper surface 67S is properly brought into surface contact with the lower surface of the seat cushion SC and pressed by the lower surface, and thus a load due to sitting can be properly detected also in the load-detecting device 1a of the present embodiment.

In the present embodiment, coil springs are used as the spring members 76, but the spring members 76 may be constituted of, for example, plate springs.

Although the load-detecting device of the present invention, has been described with reference to the above-described embodiments as examples, the present invention is not limited to the above-described embodiments.

For example, the load-detecting device of the present invention has a possibility to be used as long as presence or absence of a load on a load detection target should be detected. That is, in each of the above-described embodiments, the load-detecting device is disposed below the seat cushion SC of the seat, and whether or not a person is sitting is detected. However, the present invention is not limited to the above-described embodiments and other aspects can be employed. For example, an aspect in which the load-detecting device is disposed below a seat cushion of the nursing care bed may be exemplified. Even in such an aspect, a load can be properly detected when the lower surface of the seat cushion lowers while changing the inclination of the lower surface.

In the above-described embodiments, the first electrode 52 and the second electrode 62 are located between the lower ends 102 and the upper ends 101 of the respective S springs 100, with which the base 2 is engaged. However, according to the present invention, the first electrode 52 and the second electrode 62 are not necessarily located between the lower ends 102 and the upper ends 101 of the S springs 100 as long as the contact surface between the first electrode 52 and the second electrode 62 when a load is detected is located lower than the upper ends 101 of the S springs 100. For example, the first electrode 52 and the second electrode 62 may be located lover than the lower ends 102 of the S springs 100. In this case, the contact surface between the first electrode 52 and the second electrode 62 when a load is detected can be located lover than the lower ends 102 of the S springs 100.

In the above-described embodiments, the mount surface 21S on which the load detection sensor unit SU is mounted is located lower than the lower ends 102 of the respective S springs 100, with which the base 2 is engaged, and the mount surface 21S can be located at the same height as the lower ends 102 of the S springs 100. However, in the present invention, the mount surface 21S may be located higher than the lower ends 102 and lower than the upper ends 101 of the S springs 100. However, from the viewpoint that an oblique load applied from the upper side can be more effectively prevented from acting directly on the mount surface 21S of the base or a part in the vicinity of the mount surface 21S of the load detection sensor unit SU, the mount surface 21S is preferably located at the same height as or lower than the lower ends 102 of the S springs 100, with which the base 2 is engaged.

In the above-described embodiments, the upper surface 47S of the housing cover 4 when a load is detected is located lower than the upper ends 22U of the hook parts 22 of the base 2 engaged with the S springs 100, and may be located at the same height as the upper ends 22U of the hook parts 22. However, in the present invention, the upper surface 47S of the housing cover 4 when a load is detected may be located higher than the upper ends 22U of the hook parts 22. However, the upper surface 47S of the housing cover 4 when a load is detected is preferably located at the same height as or lower than the upper ends 22U of the hook parts 22 since an excessive load to the upper surface 47S can be suppressed.

In the above-described embodiments, the upper surface 47S of the housing cover 4 when a load is not detected is located lower than or at the same height as the upper ends 22U of the hook parts 22 of the base 2. However, in the present invention, as long as the upper surface 47S of the housing cover 4 is located at the same height as or higher than the upper ends 101 of the S springs 100, with which the base 2 is engaged, when a load is detected, the upper surface 47S of the housing cover 4 when a load is not detected may be located higher the upper ends 22U of the hook parts 22 of the base 2. In this case, the upper surface 47S of the housing cover 4 when a load is detected may be located at the same height as the upper ends 22U of the hook parts 22.

In the above-described embodiments, the load-detecting device is structured such that the upper surfaces 47S and 67S move relative to the mount surface 21S so that the angles of the upper surfaces 47S and 67S, which are the pressed surfaces, with respect to the mount surface 21S change in the front and back direction and the right and left direction of the seat device. However, in the load-detecting device of the present invention, the angle of the upper surfaces 47S and 67S with respect to the mount surface 21S does not have to change.

In the above-described embodiments, an average height position of the lower surface of the seat cushion SC when a load is not detected is located higher than the upper surface 47S of the housing cover 4. However, the present invention is not limited to this, and the average height position of the lower surface of the seat cushion SC when a load is not detected may be the same height as the upper surface 47S of the housing cover 4. However, from the viewpoint of suppressing unnecessary pressing of the upper surface 47S of the housing cover 4 by the lower surface of the seat cushion SC, the average height position of the lower surface of the seat cushion SC when a load is not detected is preferably located higher than the upper surface 47S of the housing cover 4 as in the above-described embodiments.

For the load detection sensor of the present invention, the housing cover 4 is not an essential element. For example, in the first embodiment, the housing cover 4 can be eliminated by devising the arrangement position of the load detection sensor 5. In this case, the second electrode 62 may be directly pressed by the seat cushion SC.

In the load detection sensor of the present invention, the housing 3 is not an essential element. For example, the load detection sensor does not have to include the housing 3, and also in the first embodiment, the housing 3 can be eliminated, and the load detection sensor 5 may be directly mounted on the mount, part 21 of the base 2. When the housing cover 4 is provided in this case, the housing cover 4 may be considered as a mere cover, and the cover may be fixed to the base 2 to be movable in the vertical direction.

The load detection sensor 5 is not particularly limited as long as it has a pair of electrodes. For example, the load detection sensor may be structured to include a pair of insulating sheets having flexibility, a sheet-like spacer that is interposed between the insulating sheets in pair and has at least one opening formed therein, and electrodes in pair that are provided on respective surfaces of the insulating sheets in pair and that face each other through the opening of the spacer. That is, the load detection sensor may be a membrane switch. In addition, the load detection sensor 5 may be structured such that one of the insulating sheets of this membrane switch faces the seat cushion SC. In this case, the upper surface of the insulating sheet serves as a pressed surface. Further, a switch pressing part configured to press one of the electrodes of the membrane switch may be provided. This switch pressing part corresponds to the switch pressing part 43 in the first embodiment. Thus, the switch pressing part can be considered as a shaft part. For example, when the one electrode is an electrode on the seat cushion SC side, a cover formed with a switch pressing part configured to press the one electrode can be disposed between the seat cushion SC and the one electrode similarly to the first embodiment. Alternatively, for example, when the one electrode is an electrode on the base 2 side, a switch pressing part configured to press the one electrode from the base 2 side may be provided. For example, when the load-detecting device includes the housing 3 and a membrane switch is disposed in the housing 3 as in the first embodiment, a switch pressing part may be formed on the bottom wall 37 of the housing 3. Alternatively, when the load-detecting device does not include the housing 3 and a membrane switch is directly mounted on the mount part 21 of the base 2, the switch pressing part may be formed directly on the mount part 21. In these cases, a metal plate having flexibility may be provided between one electrode pressed by the switch pressing part and the switch pressing part. In this case, due to bending of the metal plate caused by the switch pressing part pressing a part of the metal plate, the respective electrodes come into contact with each other. Generally, the insulating sheet is made of resin. However, creep such as a pressing mark easily occurs in resin. In metal, on the other hand, creep hardly occurs compared with in resin, and thus a pressing mark is hardly made on the metal plate even when a part of the metal plate is pressed by the pressing member. Therefore, erroneous detection of a load can be suppressed.

It is to be noted that respective components of the load-detecting device 1 are not limited to those described in the above-described embodiments and the variation, and some of the components may be combined, removed, and altered, and well-known technique may be added to the components, as appropriate, without departing from the object of the present invention.

As described above, according to the present invention, there is provided a load-detecting device that is capable of properly detecting a load and suppressing deterioration of detection accuracy, and can be used for a system including a seat cushion disposed on S springs. Examples of such a system include a seat device of a vehicle such as a car, and a nursing care bed.

REFERENCE SIGNS LIST 1, 1a . . . load-detecting device
2 . . . base
3 . . . housing (supporting member)
4 . . . housing cover
5 . . . load detection sensor
21 . . . mount part
21S . . . mount surface
22 . . . hook part
22U . . . upper end
41 . . . arm
42 . . . opening
43 . . . switch pressing part (shaft part)
47S . . . upper surface of housing cover (pressed surface)
50 . . . first electrode sheet
51 . . . substrate
52 . . . first electrode
53 . . . first contact part
54 . . . resistor
56 . . . lower frame
57 . . . bottom wall of lower frame
58 . . . frame wall of lower frame
60 . . . second electrode sheet
61 . . . metal sheet
62 . . . second electrode
63 . . . second contact part
66 . . . upper frame
67 . . . top wall of upper frame
67S . . . upper surface (pressed surface)
68 . . . frame wall of upper frame
70 . . . spacer
76 . . . spring member
100 . . . S spring
101 . . . upper end of S spring
102 . . . lower end of S spring
AP . . . connection maintaining part
SC . . . seat cushion
SU . . . load detection sensor unit
SW . . . switch

The invention claimed is:

1. A load-detecting device configured to be pressed by a seat cushion disposed on a plurality of S springs, the load-detecting device comprising:
   a base including a pair of engagement parts engaged with a pair of the S springs; and
   a load detection sensor unit that is mounted on the base and includes a pair of electrodes, the electrodes facing each other and being brought into contact with each other by pressing force of the seat cushion when a load is detected, wherein
   a pressed surface of the load detection sensor unit that is pressed by the seat cushion when a load is detected is located at the same height as or higher than upper ends of the respective S springs, with which the base is engaged, and
   a contact surface directly between the electrodes in pair is located lower than the upper ends of the respective S springs, with which the base is engaged,
   wherein the pressed surface when a load is not detected is located at the same height as or lower than upper ends of the pair of engagement parts.

2. The load-detecting device according to claim 1, wherein the pair of electrodes is located between lower ends and the upper ends of the respective S springs, with which the base is engaged.

3. The load-detecting device according to claim 1, wherein a mount surface on which the load detection sensor unit on the base is mounted is located at the same height as or lower than lower ends of the respective S springs, with which the base is engaged.

4. The load-detecting device according to claim 1, wherein an average height position of a lower surface of the seat cushion is located at the same height as or higher than the pressed surface when a load is not detected.

5. The load-detecting device according to claim 1, wherein the load detection sensor unit includes a supporting member that supports the pair of electrodes on the base.

6. The load-detecting device according to claim 1, wherein the load detection sensor unit includes the pressed surface and a pressing member configured to press one of the electrodes in pair.

7. The load-detecting device according to claim 1, wherein the pressed surface when a load is detected is located at a position higher than the upper ends of the respective S springs.

8. The load-detecting device according to claim 7, wherein the pressed surface when a load is not detected is located at a position lower than upper ends of the pair of engagement parts.

9. The load-detecting device according to claim 1, wherein the pressed surface when a load is not detected is located at a position lower than upper ends of the pair of engagement parts.

10. The load-detecting device according to claim 1, wherein an average height position of a lower surface of the seat cushion is located higher than the pressed surface when a load is not detected.

11. A load-detecting device configured to be pressed by a seat cushion disposed on a plurality of S springs, the load-detecting device comprising:
a base including a pair of engagement parts engaged with a pair of the S springs; and
a load detection sensor unit that is mounted on the base and includes a pair of electrodes, the electrodes facing each other and being brought into contact with each other by pressing force of the seat cushion when a load is detected, wherein
a pressed surface of the load detection sensor unit that is pressed by the seat cushion when a load is detected is located at the same height as or higher than upper ends of the respective S springs, with which the base is engaged, and
a contact surface between the electrodes in pair is located lower than the upper ends of the respective S springs, with which the base is engaged,
wherein the pair of electrodes is located between lower ends and the upper ends of the respective S springs, with which the base is engaged.

12. The load-detecting device according to claim 11, wherein a mount surface on which the load detection sensor unit on the base is mounted is located at the same height as or lower than lower ends of the respective S springs, with which the base is engaged.

13. The load-detecting device according to claim 11, wherein the pressed surface when a load is detected is located at the same height as or lower than upper ends of the pair of engagement parts.

14. The load-detecting device according to claim 13, wherein the pressed surface when a load is not detected is located higher than the upper ends of the pair of engagement parts.

15. The load-detecting device according to claim 11, wherein the pressed surface when a load is not detected is located at the same height as or lower than upper ends of the pair of engagement parts.

16. The load-detecting device according to claim 15, wherein the pressed surface when a load is not detected is located at a position lower than upper ends of the pair of engagement parts.

17. The load-detecting device according to claim 11, wherein an average height position of a lower surface of the seat cushion is located at the same height as or higher than the pressed surface when a load is not detected.

18. The load-detecting device according to claim 11, wherein the load detection sensor unit includes a supporting member that supports the pair of electrodes on the base.

19. The load-detecting device according to claim 11, wherein the load detection sensor unit includes the pressed surface and a pressing member configured to press one of the electrodes in pair.

20. The load-detecting device according to claim 11, wherein the pressed surface when a load is detected is located at a position higher than the upper ends of the respective S springs.

* * * * *